(12) United States Patent
Linzmaier

(10) Patent No.: US 9,980,288 B2
(45) Date of Patent: May 22, 2018

(54) DATA TRANSMISSION IN A SEGMENTED COMMUNICATION NETWORK

(71) Applicant: Siemens Aktiengesellschaft, Munich (DE)

(72) Inventor: Klaus-Peter Linzmaier, Winterbach (DE)

(73) Assignee: Siemens Aktiengesellschaft, Munich (DE)

( * ) Notice: Subject to any disclaimer, the term of this patent is extended or adjusted under 35 U.S.C. 154(b) by 139 days.

(21) Appl. No.: 15/110,051

(22) PCT Filed: Jan. 5, 2015

(86) PCT No.: PCT/EP2015/050022
§ 371 (c)(1),
(2) Date: Jul. 6, 2016

(87) PCT Pub. No.: WO2015/104229
PCT Pub. Date: Jul. 16, 2015

(65) Prior Publication Data
US 2016/0345361 A1 Nov. 24, 2016

(30) Foreign Application Priority Data
Jan. 10, 2014 (DE) ........................ 10 2014 200 345

(51) Int. Cl.
*H04W 16/24* (2009.01)
*H04W 74/08* (2009.01)
(Continued)

(52) U.S. Cl.
CPC ........... *H04W 74/0808* (2013.01); *B61L 3/18* (2013.01); *B61L 15/0036* (2013.01); *H04W 84/20* (2013.01)

(58) Field of Classification Search
CPC ... B61L 15/0036; B61L 3/18; H04B 7/15542; H04B 7/2606; H04W 28/26;
(Continued)

(56) References Cited

U.S. PATENT DOCUMENTS

2003/0188031 A1* 10/2003 Deikman ............. G06F 13/385
709/250
2007/0019604 A1 1/2007 Hur et al.
(Continued)

FOREIGN PATENT DOCUMENTS

DE 10306973 A1 9/2004
WO WO 2013155672 A1 10/2013

OTHER PUBLICATIONS

"PRB Segment Controller Anwenderbeschreibung, Power Rail Booster (PRB) Segment Controller User Guide"; Siemens AG; URL:http://dfpcorec-p.internal.epo.org/wf/storage/144C548C2100003D58/originalPdf#zoom=100; pp. 1-31; XP055100914; 2006.

*Primary Examiner* — Mohamed Kamara
(74) *Attorney, Agent, or Firm* — Cozen O'Connor

(57) ABSTRACT

A method for data transmission in a communication network that is split into a plurality of segments including a transmission medium and at least one slave subscriber, each segment being provided with a segment master, and two respective adjacent segments being connected by a transition region, where a segment master and a slave subscriber, which is situated in the segment of the segment master or in a transition region connecting this segment to an adjacent segment, communicate via the transmission medium of the segment of the segment master, where the segment master assigns the slave subscriber at least one transmission time interval for sending messages, so that transmission time intervals assigned by the segment master do not overlap, and where a slave subscriber within a transition region checks,
(Continued)

before sending a message, whether the transmission media of both segments connected by the transition region are free to send a message.

13 Claims, 2 Drawing Sheets

(51) Int. Cl.
*B61L 3/18* (2006.01)
*B61L 15/00* (2006.01)
*H04W 84/20* (2009.01)

(58) Field of Classification Search
CPC . H04W 72/0446; H04W 16/00; H04W 16/14; H04W 74/04; H04W 74/0808; H04W 84/18; H04W 84/20; H04L 12/00; H04L 12/26; H04L 12/40
See application file for complete search history.

(56) References Cited

U.S. PATENT DOCUMENTS

| | | | |
|---|---|---|---|
| 2008/0008201 A1* | 1/2008 | Imahase | H04L 29/12207 370/401 |
| 2012/0008947 A1* | 1/2012 | Adhikari | H04J 14/02 398/58 |
| 2013/0077490 A1* | 3/2013 | Sela | H04B 7/1858 370/235 |

* cited by examiner

DATA TRANSMISSION IN A SEGMENTED COMMUNICATION NETWORK

CROSS-REFERENCE TO RELATED APPLICATIONS

This is a U.S. national stage of application No. PCT/EP2015/050022 filed 5 Jan. 2015. Priority is claimed on German Application No. 10 2014 200 345.8 filed 10 Jan. 2014, the content of which is incorporated herein by reference in its entirety.

BACKGROUND OF THE INVENTION

1. Field of the Invention

The invention relates to a method for data transmission in a communication network that is split into a plurality of segments, each of which includes a segment master and a transmission medium, and include at least one slave subscriber.

2. Description of the Related Art

Segmented communication networks are known, for example, in the area of mobile communications, where the segments of a mobile communications network are the radio cells of the network. Furthermore, segmented communication networks are known, for example, for conveyor or transport systems having track-guided transport units, where track sections are subdivided into different track segments, within which are installed communication segments. Such types of communication network have mobile subscribers that may be located in different segments and for which the data transmission needs to be reorganized accordingly when moving from one segment into another segment.

WO 2013/155672 A1 discloses a method for wireless communication, where a device is defined and controlled by a base station of a superordinate network as a master of a cluster of devices that operate in a first frequency band.

US 2007/0019604 discloses a media access method for a wireless sensor network in which immobile nodes that communicate via a CSMA/CA method are employed in overlapping regions. In the segments themselves, nodes are employed that communicate via a TDMA method. Nodes that handle both methods or a method that combines both methods are not disclosed.

SUMMARY OF THE INVENTION

It is an object of the invention to provide an improved method for data transmission in a segmented communication network.

This and other objects and advantages are achieved in accordance with the invention by a method in which data is transmitted in a communication network that is split into a plurality of segments, each of which includes a transmission medium, and includes at least one slave subscriber. In accordance with the invention, each segment is provided with a segment master in order to coordinate the data transmission in the segment and two respective adjacent segments are connected by a transition region connected to the transmission media of both segments. A segment master and a slave subscriber, which is situated in the segment of the segment master or in a transition region connecting this segment to an adjacent segment, communicate via the transmission medium of the segment of the segment master by sending messages, where the segment master assigns the slave subscriber at least one transmission time interval for sending messages, so that the transmission time intervals assigned by the segment master do not overlap. A slave subscriber within a transition region checks prior to the sending of a message whether the transmission media of both segments connected by the transition region are free to send a message, and sends the message only if the check reveals that both transmission media are free to send a message.

The method in accordance with the invention enables a largely collision-free data transmission in a segmented communication network having mobile slave subscribers that can change their positions between different segments of the communication network. To this end, a master-slave principle and a busy check on transmission media are combined to produce a media access method to avoid data collisions during the data transmission by way of the transmission media.

With regard to the master-slave principle used, each segment is provided with a segment master that assigns non-overlapping transmission time intervals for sending messages to slave subscribers that are situated in its segment or in a transition region to an adjacent segment. As a result, a maximum of only one network component situated in a particular segment (the segment master or a slave subscriber) ever accesses the transmission medium of the respective segment at any time.

When a slave subscriber moves from one segment into another segment, the slave subscriber crosses a transition region connecting the two segments, in which it receives messages from both the segments and is able to send messages into both segments. Without additional measures, this could result in data collisions if the slave subscriber is assigned a transmission time interval, by the segment master of one of the two segments, in which the transmission medium of the other segment is already busy.

In order to avoid such data collisions, the method in accordance with the invention provides a busy check of the transmission media in which a slave subscriber that is situated in a transition region checks, prior to sending, whether the transmission media of both the segments connected by the transition region are free to send a message, and sends the message only if the check reveals that both transmission media are free to send a message. In this manner, although a data collision that is caused by a slave subscriber in a transition region is not completely excluded, the probability thereof is however considerably reduced. Remaining data collisions that arise, for example, as a result of simultaneous sending of messages by a slave subscriber in a transition region and a network component in one of the segments connected by the transition region, are dealt with separately (which may result in a message repetition) but will be very rare occurrences and will therefore be tolerated.

The avoidance of data collisions in a segmented communication network in accordance with the invention has the advantage compared with other methods that it can be implemented relatively simply and cost-effectively. It would, for example, be conceivable to avoid data collisions caused by messages sent from transition regions by coordinating the assignment of the transmission time intervals by the segment masters of adjacent segments such that the transmission time intervals do not overlap. As a result of the concatenation of all segments, this would however require the coordination of all segment masters and therefore be considerably more demanding in terms of technical complexity and financial outlay than the combination in accordance with the invention of a master-slave principle with a busy check of the transmission media. In particular, the method in accordance with the invention requires no coordination and synchronization of the segment masters of different segments of the communication network, in other words the segment masters of different segments function independently of one another.

Furthermore, in order to implement the method in accordance with the invention, it is possible to draw on conventional methods, such as the Carrier Sense Multiple Access (CSMA) method for the busy check of the transmission media, which can be implemented using cost-effectively and commercially available components.

Overall therefore the method in accordance with the invention advantageously enables an efficient implementation, which can nevertheless be realized relatively simply and cost-effectively, of a broadband and largely collision-free data transmission in a segmented communication network, where no substantial restrictions exist either for the numbers of segments and subscribers or for the extent of the communication network because the segments are managed practically independently of one another.

In an embodiment of the invention, a slave subscriber checks within a segment prior to sending a message whether the transmission medium of the segment in which it is situated is free to send a message, and sends the message only if the check reveals that the transmission medium is free to send a message.

The busy check on transmission media by slave subscribers is therefore performed not only in transition regions but always, in other words also outside the transition regions. This further simplifies the method because a busy check does not depend on the position of a slave subscriber. Furthermore, standard methods of media access management such as CSMA do in any event provide a constant busy check, which means that these standard methods can be employed without them needing to be modified.

In a further embodiment of the invention, messages for a slave subscriber are buffered by a segment master in a message queue and messages buffered in the message queue are sent in bundled fashion. In other words, a segment master collects messages for a slave subscriber and then sends them in a bundled manner instead of sending each message individually. In this way, the data traffic by way of the transmission medium is advantageously reduced or the efficiency of utilization of the transmission medium is increased.

In another embodiment of the invention, the transmission media of different segments are separated from one another so that messages from one segment are not transmitted into any other segment.

With a strict separation of the segments, this advantageously serves to prevent messages from one segment from being transmitted into another segment and there causing data collisions.

In an alternative embodiment of the invention, each segment is defined as a receive region within which messages sent by the segment master of the segment can be received and interpreted by a slave subscriber and messages sent by a slave subscriber can be received and interpreted by the segment master of the segment, and a transition region is defined as an overlap region in which adjacent segments overlap. The presently contemplated embodiment of the invention is particularly advantageous if receive regions can be defined via a suitably limited range over which messages can be exchanged at sufficient quality within the communication network between a segment master and a slave subscriber.

With regard to the aforementioned embodiment, the transmission media of adjacent segments are, for example, connected to one another or each defined as a part of a contiguous communication medium if the communication network has such a communication medium.

In still a further embodiment of the invention, the messages are transmitted via a carrier frequency method. This advantageously enables existing resources and known methods to be utilized for data transmission. In particular, the presently contemplated embodiment enables the use of conventional and cost-effective technologies, such as power-line communication (PLC) for data transmission in segmented networks.

In a preferred embodiment of the invention, the method in accordance with the invention is used for data transmission in a contact conductor network having at least one contact conductor and at least one slave subscriber connected to a contact conductor and capable of movement along the contact conductor.

In the context of the disclosed embodiments of the invention, a contact conductor network is to be understood as a network for a transport system or a conveyor system having automatically controlled transport vehicles, the task whereof being to transport material or persons and which are supplied with energy or data by way of contact conductors. Here, the contact conductor network normally has a plurality of contact conductors, such as one contact conductor each for each phase of an AC voltage, one contact conductor as grounding conductor and/or one or more contact conductors for data transmission. For example, electric overhead conveyors exist as transport systems having contact conductor networks. The electric overhead conveyor is a track-bound means of conveyance having individually driven transport vehicles. The transport vehicles can move autonomously and independently of one another on the track system.

Such contact conductor networks are frequently and advantageously segmented, i.e., subdivided into contact conductor segments. The invention is therefore particularly advantageously suited for data transmission in a segmented contact conductor network, in particular if the segments of the communication network are assigned to contact conductor segments. Here, at least one transmission medium preferably comprises at least one contact conductor of the contact conductor network. Contact conductors of the contact conductor network are thereby advantageously used for data transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention described above and also the manner in which they are achieved will become more clearly and obviously understandable in conjunction with the following description of exemplary embodiments which are explained in detail with reference to a drawing, in which.

DETAILED DESCRIPTION OF THE EXEMPLARY EMBODIMENTS

Figure 1:
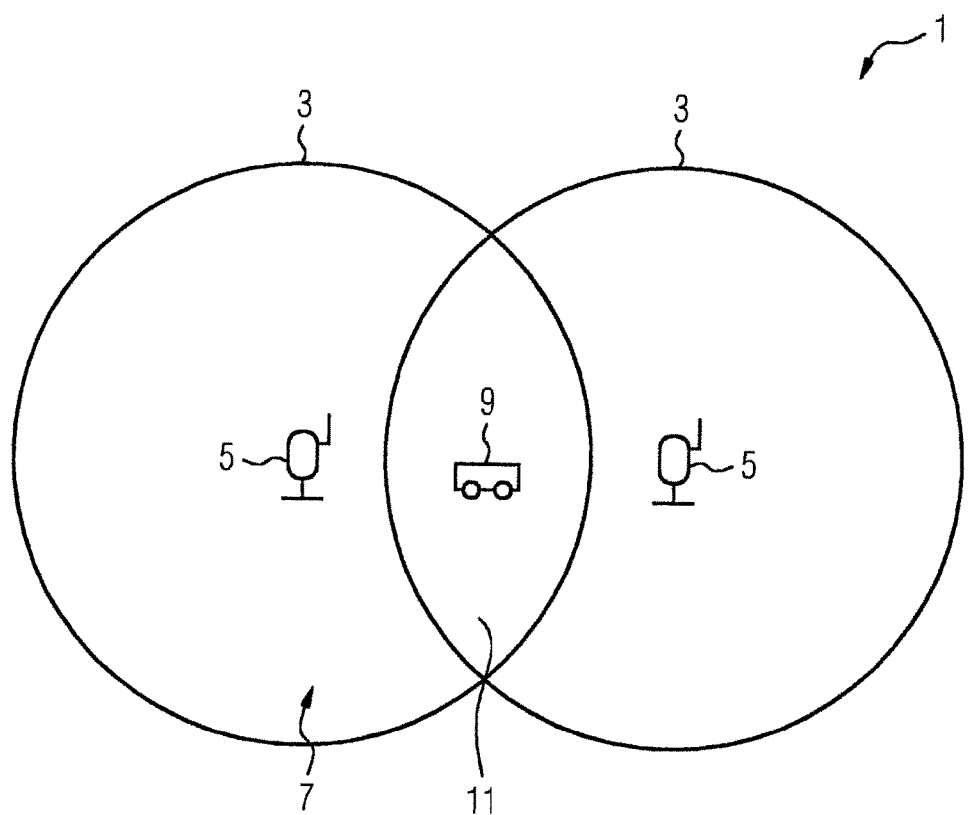
FIG. 1 is a schematic block diagram of a communication network.

FIG. 1 shows a purely schematic view of a communication network 1 which is split into a plurality of segments 3, each of which include a locationally fixed segment master 5 and a transmission medium 7, and includes at least one mobile slave subscriber 9 that is movable within the segments 3 and between the segments 3. Each two adjacent segments 3 are connected via a transition region 11 connected to the transmission media 7 of both segments 3. Only two segments 3 and one transition region 11 are illustrated in FIG. 1 by way of example. The communication network 1 can, however, also have more than two segments 3 and correspondingly more transition regions 11.

A segment master 5 and a slave subscriber 9, which is situated in the segment 3 of the segment master 5 or in a transition region 11 connecting the segment 3 to an adjacent segment 3, communicate by way of the transmission medium 7 of the segment 3 of the segment master 5 by sending messages. Here, the segment master 5 assigns at least one transmission time interval to the slave subscriber 9 via at least one message, within which interval the slave subscriber 9 may itself send messages, which means that the transmission time intervals assigned by the segment master 5 do not overlap. Transmission time intervals have lengths, for example, in the single-digit millisecond range.

By preference in this situation, messages for a slave subscriber 9 are buffered by a segment master 5 in a message queue and messages buffered in the message queue are sent in a bundled manner.

The segment masters 5 are, for example, each configured as a modem. The slave subscribers 9 can likewise each be configured as a (mobile) modem or comprise one or more modems.

A slave subscriber 9 that is situated within a transition region 11 checks, prior to sending a message, whether the transmission media 7 of both segments 3 connected by the transition region 11 are free to send a message, and sends the message only if the check reveals that both transmission media 7 are free to send a message. Correspondingly, a slave subscriber 9, which is situated within a segment 3 outside a transition region 11, checks prior to sending a message whether the transmission medium 7 of the segment 3 in which it is situated is free to send a message, and sends the message only if the check reveals that the transmission medium 7 is free to send a message. Here, a message is naturally only sent by a slave subscriber 9 within a transmission time interval assigned to it for that purpose.

Depending on the application and embodiment of the communication network 1, the transmission media 7 and transition regions 11 can be configured differently.

For example, the transmission media 7 of different segments 3 can be separated from one another so that messages from one segment 3 are not transmitted into any other segment 3. This can be achieved, for example, by designing the transmission media 7 in each case as lines over which data can be transmitted, where the lines of different segments 3 are physically separated from one another or a data transmission between different segments 3 is suppressed by network components. In such cases, lines of two adjacent segments 3 are, for example, taken as far as a transition region 11 connecting the segments.

Alternatively, the transmission media 11 of adjacent segments 3 can be connected to one another or each defined as a part of a contiguous communication medium. In this case, each segment 3 is defined by a range over which messages can be exchanged at sufficient quality between a segment master 5 and a slave subscriber 9. For example, messages are transmitted over a continuous line and a receive region extending over a range of the data transmission between the segment master 5 and a slave subscriber 9 along the line is defined as segment 3. In such cases, a transition region 11 is defined as an overlap region in which adjacent segments 3 overlap, i.e., in which messages can be exchanged at sufficient quality between a slave subscriber 9 and the segment masters 5 of the two segments 3.

The communication network 1 is used, for example, for data transmission in a contact conductor network having at least one contact conductor and at least one slave subscriber 9 that is connectable to a contact conductor and is capable of movement along the contact conductor. For example, the slave subscribers 9 in this situation are electric overhead conveyors and are used, for example, in the automobile manufacturing sector. A contact conductor is used in this situation, for example, as a transmission medium 7 or part of a transmission medium 7 and the messages can, for example, be transmitted via a carrier frequency method, such as power-line communication (PLC).

Figure 2:
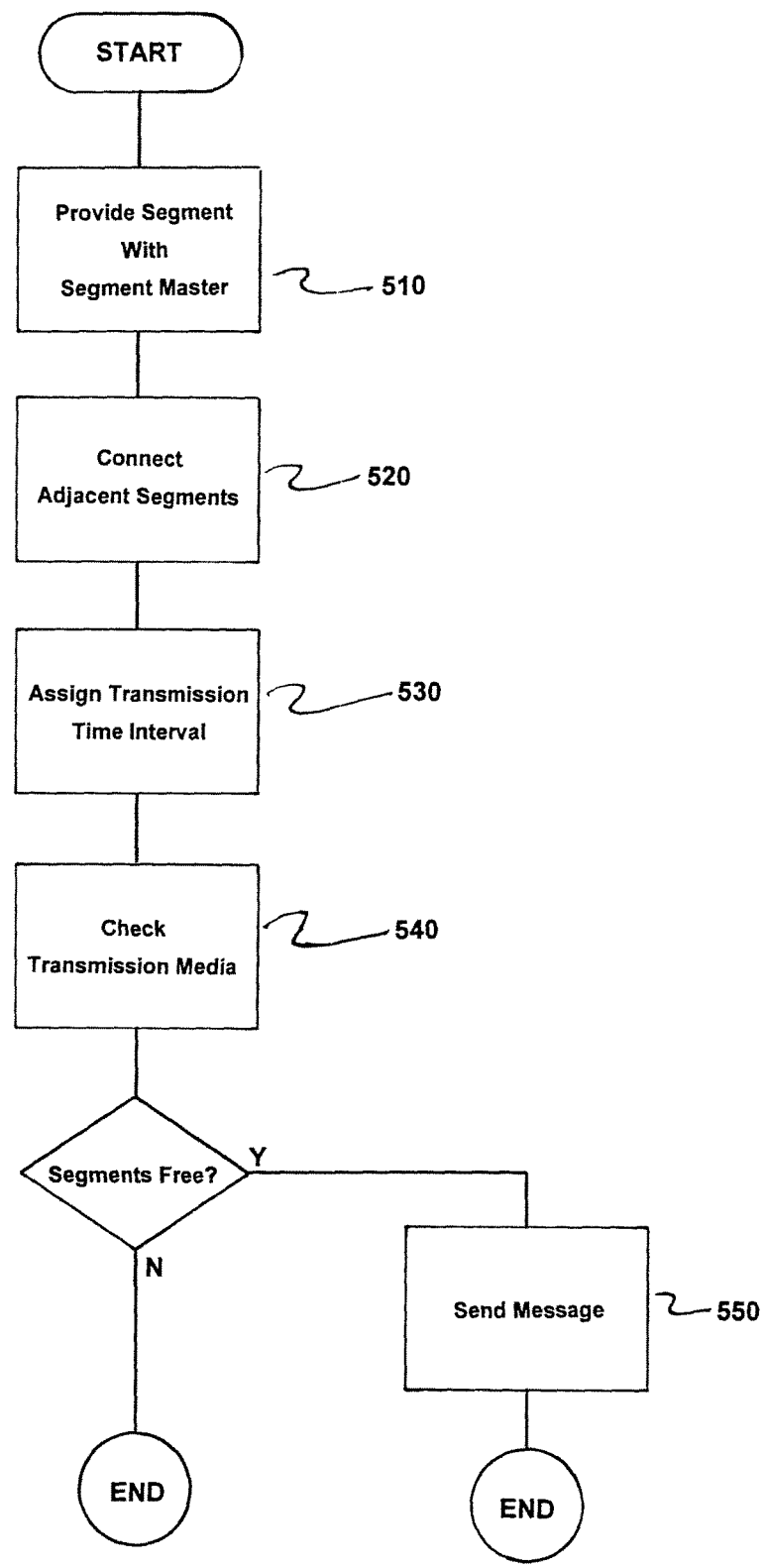
FIG. 2 is flowchart of the method in accordance with the invention.

FIG. 2 is a flowchart of a method for data transmission in a communication network (1) which is split into a plurality of segments (3), where each data transmission in a communication network (1) includes a transmission medium (7) and at least one slave subscriber (9), and the slave subscriber (9) is a mobile slave subscriber that changes its position between different segments of the communication network. The method comprises providing each segment (3) with a segment master (5) to coordinate the data transmission in the segment (3), as indicated in step 210.

Next, two respective adjacent segments (3) are connected by a transition region (11) that is connected to the transmission media (7) of the plurality of segments (3), as indicated in step 220.

Next, a segment master (5), assigns at least one transmission time interval for sending messages to the slave subscriber (9) such that the transmission time intervals assigned by the segment master (5) do not overlap, as indicated in step 230. In accordance with the invention, the segment master (5) and a slave subscriber (9), which is situated in the segment (3) of the segment master (5) or in a transition region (11) connecting this segment (3) to an adjacent segment (3), communicate via the transmission medium (7) of the segment (3) of the segment master (5) by sending messages.

Next, prior to sending a message, a slave subscriber (9) within a transition region (11) performs a check to determine whether the transmission media (7) of each segment of the plurality of segments (3) connected by the transition region (11) are free to send a message, as indicated in step 240.

The message is now only if the check reveals that both transmission media (7) of each segment of the plurality of segments (3) are free to send a message, as indicated in step 250.

Although the invention has been illustrated and described in detail by means of preferred exemplary embodiments, the invention is not restricted by the disclosed examples and other variations can be derived therefrom by the person skilled in the art without departing from the scope of protection of the invention.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data transmission in a communication network which is split into a plurality of segments, each data transmission in a communication network having a transmission medium and having at least one slave subscriber, and the slave subscriber being a mobile slave subscriber which changes its position between different segments of the communication network, the method comprising:
   providing each segment with a segment master to coordinate the data transmission in the segment;
   connecting two respective adjacent segments by a transition region which is connected to the transmission media of the plurality of segments;
   assigning, by a segment master, at least one transmission time interval for sending messages to the slave subscriber such that the transmission time intervals assigned by the segment master do not overlap, the segment master and a slave subscriber, which is situated in the segment of the segment master or in a transition region connecting this segment to an adjacent segment, communicating via the transmission medium of the segment of the segment master by sending messages;
   checking, by a slave subscriber within a transition region, prior to sending a message, whether the transmission media of each segment of the plurality of segments connected by the transition region are free to send a message; and
   sending the message only if the check reveals that both transmission media of each segment of the plurality of segments are free to send a message.

2. The method as claimed in claim 1, wherein a slave subscriber within a segment checks, prior to sending the message, whether the transmission medium of the segment in which said slave subscriber is situated is free to send a message, and sends the message only if the check reveals that the transmission medium is free to send the message.

3. The method as claimed in claim 1, wherein messages for the slave subscriber are buffered by a segment master in a message queue and messages buffered in the message queue are sent in bundled manner.

4. The method as claimed in claim 1, wherein the transmission media of different segments are separated from one another such that messages from one segment are not transmitted into any other segment.

5. The method as claimed in claim 1, wherein each segment is defined as a receive region within which messages sent by the segment master of the segment are receivable and interpreted by the slave subscriber and messages sent by the slave subscriber are receivable and interpreted by the segment master of the segment, and a transition region is comprises an overlap region in which adjacent segments overlap.

6. The method as claimed in claim 2, wherein each segment is defined as a receive region within which messages sent by the segment master of the segment are receivable and interpreted by the slave subscriber and messages sent by the slave subscriber are receivable and interpreted by the segment master of the segment, and a transition region is comprises an overlap region in which adjacent segments overlap.

7. The method as claimed in claim 3, wherein each segment is defined as a receive region within which messages sent by the segment master of the segment are receivable and interpreted by the slave subscriber and messages sent by the slave subscriber are receivable and interpreted by the segment master of the segment, and a transition region is comprises an overlap region in which adjacent segments overlap.

8. The method as claimed in claim 5, wherein the transmission media of adjacent segments are connected to one another.

9. The method as claimed in claim 5, wherein the communication network includes a contiguous communication medium and the transmission media of the individual segments are each defined as a part of the communication medium.

10. The method as claimed in claim 8, wherein the communication network includes a contiguous communication medium and the transmission media of the individual segments are each defined as a part of the communication medium.

11. The method as claimed in claim 1, wherein the messages are transmitted based on a carrier frequency method.

12. The method as claimed in claim 1, wherein the method is implemented in a contact conductor network having at least one contact conductor and at least one slave subscriber connected to a contact conductor and capable of movement along the contact conductor.

13. The method of as claimed in claim 12, wherein at least one transmission medium comprises at least one contact conductor of the contact conductor network.

* * * * *